June 19, 1951
L. A. SKINNER ET AL
2,557,151
SPRING ACTUATED GENERATOR FOR ROCKET LAUNCHERS
Filed Aug. 24, 1944
3 Sheets-Sheet 2
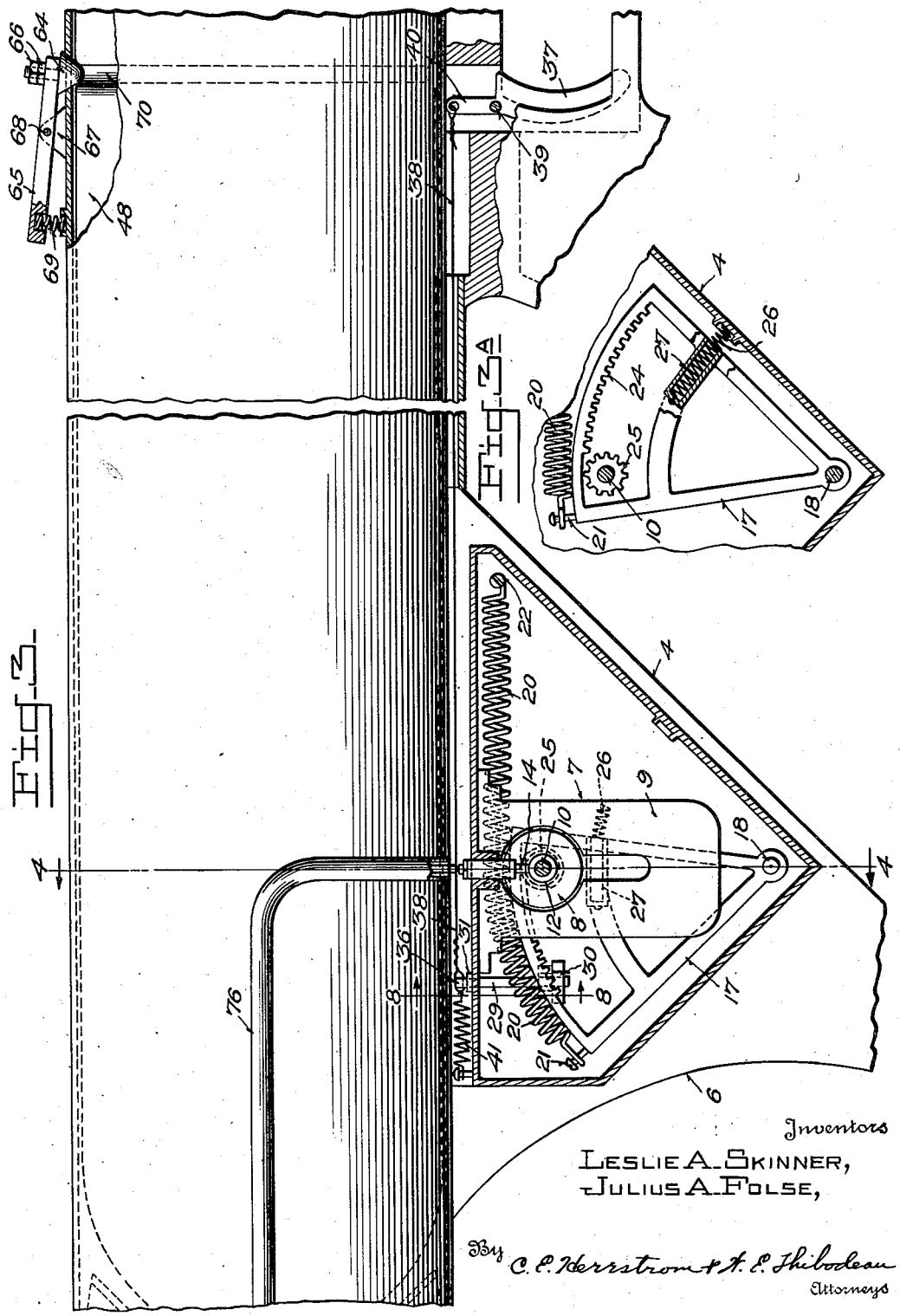
Inventors
LESLIE A. SKINNER,
JULIUS A. FOLSE,
By C. E. Herrstrom & A. E. Thibodeau
Attorneys

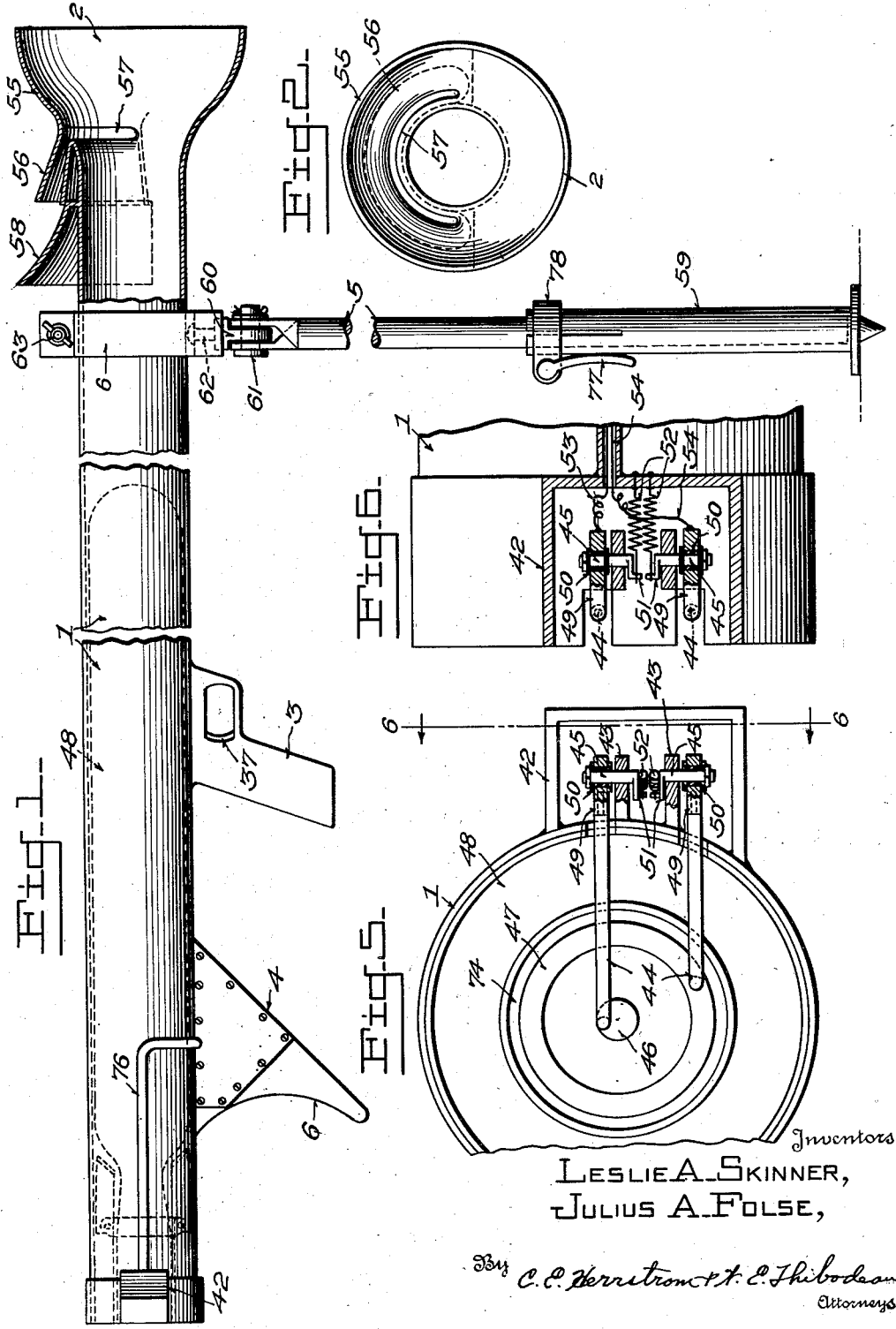

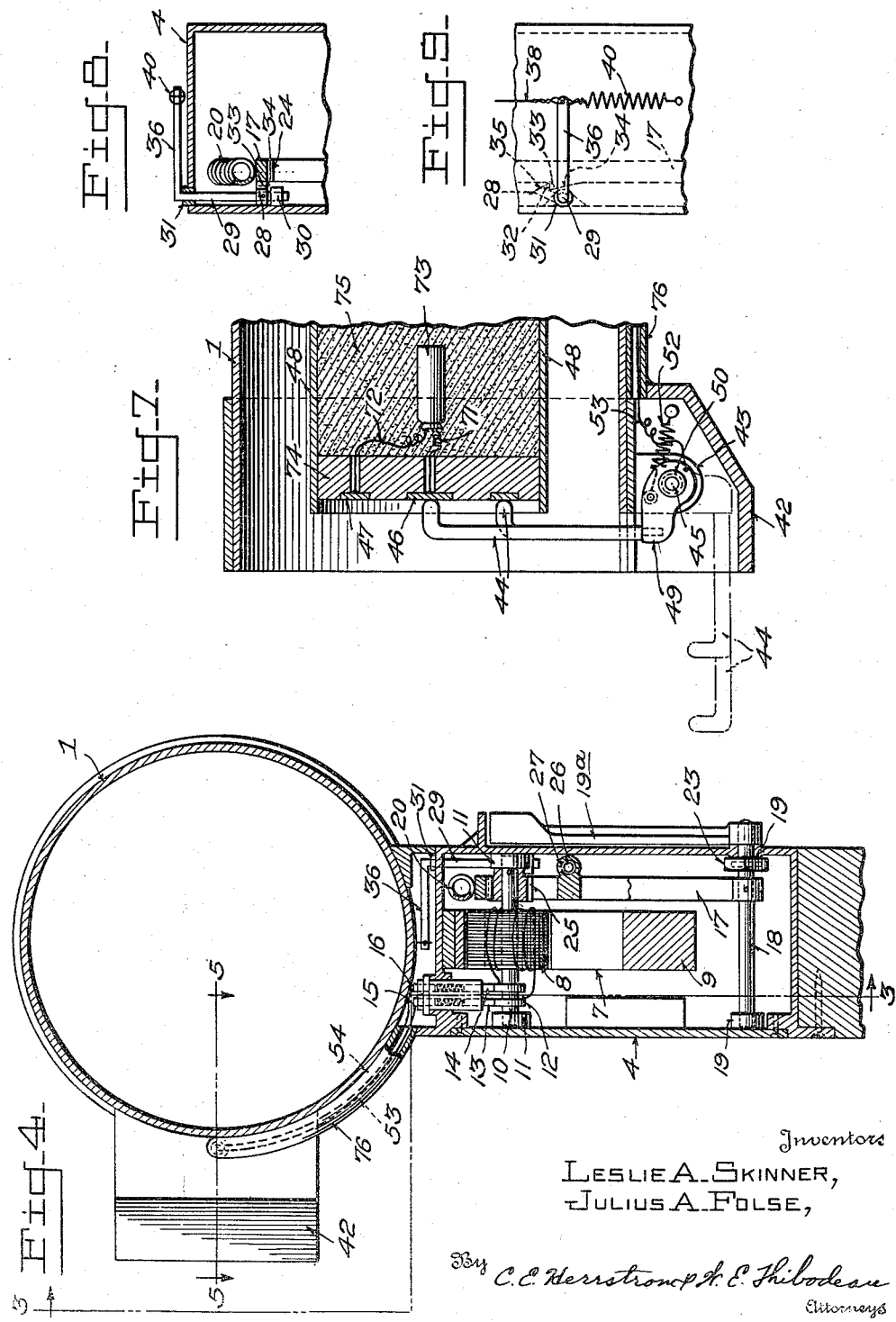

Patented June 19, 1951

2,557,151

UNITED STATES PATENT OFFICE 2,557,151

SPRING ACTUATED GENERATOR FOR ROCKET LAUNCHERS

Leslie A. Skinner, Berkeley, Calif., and Julius A. Folse, Miami, Fla., assignors to the United States of America as represented by the Secretary of War Application August 24, 1944, Serial No. 551,052

2 Claims. (Cl. 89—135)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a rocket projector, more particularly to a rocket projector for use by airborne troops.

It is an object of this invention to provide an electrically fired rocket projector, the source of current being supplied by a magneto.

A particular object of this invention is to provide a rocket projector for airborne troops having a bipod mount to facilitate handling of such projector by one individual.

The specific nature of the invention as well as other objects and advantages thereof will clearly appear from a description of a preferred embodiment as shown in the accompanying drawings in which:

Fig. 1 is a side elevational view of the rocket projector partly broken away to show the muzzle deflector in longitudinal section.

Fig. 2 is a right end elevational view of the muzzle deflector shown in Fig. 1.

Fig. 3 is a partial longitudinal sectional view taken along the plane 3—3 of Fig. 4 showing the magneto utilized for the electric current source.

Fig. 3A is a fragmentary longitudinal sectional view of the shoulder stock showing the magneto operating arm in the discharged position.

Fig. 4 is a cross-sectional view taken along the plane 4—4 of Fig. 3.

Fig. 5 is a sectional view taken along the plane 5—5 of Fig. 4.

Fig. 6 is a sectional view taken along the plane 6—6 of Fig. 5.

Fig. 7 is an enlarged detailed longitudinal sectional fragmentary view of the rear end of the rocket projector.

Fig. 8 is a cross-sectional view taken along the plane 8—8 of Fig. 3.

Fig. 9 is a top elevational view of Fig. 8.

There is shown in Fig. 1 in assembled relation a rocket projector comprising essentially a long cylindrical metal sheet tube 1 terminating at the forward end in a gas blast deflector 2. A pistol grip 3 and a shoulder stock 4 are secured to the under side of tube 1 as shown in Fig. 1 preferably by welding. A bipod 5 to be later described is secured to tube 1 slightly to the rear of deflector 2 as by a collar 6.

The shoulder stock 4 is a substantially triangular shaped member having an arcuate rear surface 6 shaped to comfortably fit the shoulder of the firer. The interior of shoulder stock 4 is hollow and houses a spring operated magneto 7. Magneto 7 comprises an armature 8 and a permanent magnet field 9. The armature 8 is rotatably mounted within field 9 by a horizontal shaft 10. The shaft 10 is supported on each of the sides of shoulder stock 4 by two inwardly projecting bosses 11. A collector 12 is provided on the left of armature 8 on shaft 10 as shown in Fig. 4. Collector 12 is connected by two brushes 13 and 14 which are in turn connected to terminals 15 and 16 respectively. Armature 8 is arranged to be rotated by a spring biased, segment shaped arm 17.

The arm 17 is skeletonized as shown in Fig. 3 and is rotatably mounted on a horizontal shaft 18. The shaft 18 is supported by two inwardly projecting bosses 19, one each of which is provided on opposite sides of shoulder stock 4 near the bottom thereof.

Gear teeth 24 are provided on the under side of the arcuate end of segment shaped arm 17 which engages a spur gear 25 secured to armature shaft 10. Teeth 24 stop somewhat short of the left side of arm 17 as shown in Figs. 3 and 3A so that such teeth will become disengaged from spur gear 25 when arm 17 is rotated to the position shown in Fig. 3A. Thus armature 8 will be free to spin rapidly after receiving the initial impetus from arm 17. A shock absorbing spring 26 is mounted within a suitable hole 27 in arm 17 as shown in Fig. 3A. Spring 26 is provided to cushion the blow of arm 17 against the forward end of shoulder stock 4 when such arm is released to rotate armature 8 of magneto 7 as will be presently described. The arm 17 is rotated about shaft 18 against the bias of a spring 20 to the operating position by a lever 19a and such arm is held in this position by a latch member 28 as shown in Fig. 9.

The lever 19a is fixedly secured to shaft 18 in suitable fashion outside of shoulder stock 4. The lever 19a is provided to rotate arm 17 about shaft 18 to load the spring 20 for the purpose of actuating magneto 7 as will be presently described. One end of spring 20 is secured to the left side of arm 17 as by a screw 21. The other end of spring 20 is secured to the upper right-hand corner of shoulder stock 4 as by a screw 22. A collar 23 surrounds shaft 18 adjacent the inside of shoulder stock 4 and is suitably secured to such shaft to prevent displacement of shaft 18.

A shaft 29 is positioned between arm 17 and the right side of shoulder stock 4 as shown in Fig. 4. The lower end of shaft 29 is supported by a boss 30 secured as by welding to side of shoulder stock 4. The upper end of shaft 29 is supported by a suitable boss 31. Latch 28 is fixedly mounted on a vertical shaft 29. Latch 28 is provided with a notch 32 which engages an integral lug 33 provided on the side of arm 17. A slope surface 34 is provided on lug 33 to cooperate with a correspondingly sloped surface 35 on latch 28 so that latch 28 will be cammed into engagement with lug 33 to hold arm 17 in a cocked position shown in Fig. 3.

A horizontal lever 36 preferably integrally formed with shaft 29 projects across the top of shoulder stock 4 as shown in Fig. 8. Lever 36 is connected to a trigger 37 by a wire 38. Trigger 37 is pivotally mounted within a suitable recess in pistol grip 3 as by a pin 39. An integral vertical lever 40 is provided on trigger 39 to which the wire 38 is connected. A spring 41 is suitably connected between lever 36 and shoulder stock 4 to bias lever 36 to the left as shown in Fig. 3 thus biasing latch 28 in engagement with lug 33 on arm 17 and maintaining trigger 37 in the operating position until manually depressed.

On the left side of tube 1 and at the rear thereof as shown in Figs. 1 and 5, there is provided a small substantially rectangular housing 42. Such housing is preferably secured to tube 1 as by welding. Within housing 42 two oppositely disposed spaced lugs 43 are secured to the periphery of tube 1 as by welding. Contact fingers 44 are respectively secured to a pair of arms 49 each of which is pivotally mounted on each lug 43 by a pin 45. Each finger 44 is a rod-like member, the upper end of which is bent inwardly as shown in Fig. 7 to contact, respectively an axial contact disc 46 and a contact ring 47. The contact disc 46 and contact ring 47 are mounted in a plug 74 of suitable electrically insulating material secured in the extreme rear end of a rocket projectile 48. Contact disc 46 and contact ring 47 are connected by leads 71 and 72 respectively to an electrically fired squib 73 mounted in the interior of rocket projectile 48 adjacent the propellant material 75.

A bushing 50 of suitable electrical insulating material surrounds each pin 45 to insulate such fingers from the rocket projector. An integral arm 51 is provided on the inside ends of each pin 45. A pair of over center springs 52 are connected respectively between each arm 51 and housing 42 to hold fingers 44 either upward in contact with contact disc 46 and contact ring 47 or in a downward position shown in dotted outline in Fig. 7 where fingers 44 are out of engagement with contact disc 46 and contact ring 47. Connection is made between each arm 44 and terminals 15 and 16 by suitable lead wires 53 and 54 which are contained within a conduit 76 suitably secured to the outside of tube 1 and housing 42 as by welding.

Muzzle deflector 2 may be integrally formed with tube 1 or may be of separate construction and secured to the forward end of tube 1 by welding. The extreme forward end of deflector 2 is of substantially semi-spherical configuration as shown at 55. A rearwardly projecting nozzle 56 is secured by welding immediately in back of the spherically shaped portion 55. Such nozzle is funnel-shaped and extends semi-annularly around muzzle deflector 2. A semi-annular opening 57 in muzzle deflector 2 communicates with nozzle 56 and the interior of deflector 2. An upwardly flared deflector flange 58 is provided directly in back of nozzle 56 to deflect the gases escaping through nozzle 56 upwardly. Such collar extends half-way around the periphery of tube 1 and is secured to such tube preferably by welding. The resultant force of the escaping gas is thus downward which tends to stabilize the projector tube 1.

Bipod 5 comprises a collar 6 surrounding tube 1 and a pair of telescoping legs 59 each of which is pivotally secured to a depending lug 60 on collar 6 as by a pin 61. The legs 59 may be locked at any desired height by an eccentric locking latch 77 secured to each leg by a collar 78. Lug 60 is rotatably secured to collar 6 by a stem 62. Collar 6 is preferably constructed of two halves and such portions are clamped about tube 1 by a thumb screw 63. Thus bipod 5 may be moved to any position desired on tube 1 by merely sliding collar 6 along to the position desired and then tightening thumb screw 63.

The rocket projectile 48 is positioned within tube 1 by a detent 64 (Fig. 3). Detent 64 is secured to a lever 65 by a pair of nuts 66. Lever 65 is pivotally mounted on top of tube 1 within a welded bifurcated lug 67 by a pin 68. A spring 69 which rests within a suitable recess in the under side of lever 65 in a suitable recess on top of tube 1 is provided to bias detent 64 downwardly into engagement with an annular groove 70 provided on the rocket projectile 48. Thus when a rocket projectile is inserted into the rear end of tube 1, detent 64 will snap into groove 70 to position such projectile within tube 1.

With the rocket projectile 48 positioned in tube 1, discharge of such projectile is then effected electrically. Lever 19a is manually pulled rearwardly thereby loading spring 20. The arm 17 is then retained in the cocked position by latch 28. Upon release of trigger 37, latch 28 is pulled away from lug 33 and arm 17 is rapidly rotated forwardly by the bias of spring 20. Gear teeth 24 on arm 17 then rapidly spins spur gear 25 and hence armature 8. Rotation of armature 8 generates a small electrical voltage which is transmitted by lead wires 52 and 53 to contact fingers 44 and thence to contact point 46 and contact ring 47 thereby effecting discharge of squib 73 within the rocket projectile 48. The igniter composition 75 is thereby ignited effecting discharge of rocket projectile 48.

From the foregoing description it is readily apparent that a socket projector is hereby provided particularly adapted for use by airborne troops, being of simple, rugged construction. By utilizing a self-generating, electrical igniting apparatus of the type herein described there need be no concern relative to replacement of batteries or other parts to effect discharge of electrically fired rocket projectiles.

We claim:

1. A rocket projector, comprising a rocket tube, a housing mounted on said tube in alignment with a trigger mechanism spaced from said housing and carried by said tube, a magneto armature having slip rings connected thereto journaled in said housing, a pinion connected to said armature, a segmental shaped arm having an arcuate periphery pivotally mounted in said housing at the center of the segment, gear teeth on the arcuate periphery of said arm arranged to engage said pinion whereby pivotal movement of said arm rotates said magneto armature, a cocking lever on said housing for rotating said arm, a spring having one end attached to said arm and the other end attached to said housing to resist one direction of pivotal movement of said arm, latching means on said housing and said arm, said trigger mechanism connected to said latching means, said latching means releasably retaining said arm in cocked position thereby stressing said spring, a second spring mounted in said arm arranged to cushion said arm when said trigger mechanism releases said latching means to cause said armature to rotate.

2. In a rocket projector comprising a tube having a funnel shaped muzzle deflector and adapted to contain and discharge rockets having self contained charges, a housing on said tube, a trigger mechanism on said tube aligned with said housing, means for igniting the said charges comprising an alternating current generator having solid permanent magnet field poles, an armature rotatably mounted between said field poles on a shaft, a pinion on said shaft, slip rings fixed to the said shaft and connected to the said armature, and means to rotate the said armature comprising an arcuate arm pivotally mounted in the said housing, gear teeth on the said arcuate arm arranged to engage with said pinion, a first helical spring between said arcuate arm and said housing and connected thereto to resist one direction of pivotal movement of said arm and to urge the arm in the opposite direction, latching means on said housing and said arm, said trigger mechanism connected to said latching means, a second helical spring mounted in said arm at a point of shorter radius from the center of rotation of said arm than the first mentioned spring, said second spring adapted to cushion the impact between the said arm and the said housing when the said latching means is released by pressure on the said trigger and the said armature rotates in response to the urging of the first mentioned spring.

LESLIE A. SKINNER.
JULIUS A. FOLSE.

REFERENCES CITED

The following references are of record in the file of this patent:

UNITED STATES PATENTS

| Number | Name | Date |
|---|---|---|
| 372,958 | Bradley et al. | Nov. 8, 1887 |
| 407,327 | Buell | July 23, 1889 |
| 1,155,061 | Heinemann | Sept. 28, 1915 |
| 1,280,579 | Stone et al. | Oct. 1, 1918 |
| 1,670,419 | Mayer | May 22, 1928 |
| 2,156,605 | Prettyman | May 2, 1939 |
| 2,389,514 | Kennedy | Nov. 20, 1945 |

OTHER REFERENCES

"Weapons of World War II," Barnes, pages 48–49.